(12) United States Patent
Sorenson

(10) Patent No.: US 7,444,591 B1
(45) Date of Patent: *Oct. 28, 2008

(54) METHODS INVOLVING TEXT ATTRIBUTE RECOGNITION

(75) Inventor: Michael W. Sorenson, Cambridge, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/965,382

(22) Filed: Dec. 27, 2007

(51) Int. Cl.
G06F 17/00 (2006.01)

(52) U.S. Cl. .................. 715/269; 715/235; 715/250

(58) Field of Classification Search .................. 715/269, 715/235, 250
See application file for complete search history.

(56) References Cited

U.S. PATENT DOCUMENTS

| | | | | |
|---|---|---|---|---|
| 5,805,164 A * | 9/1998 | Blum et al. | .................. | 715/808 |
| 6,700,591 B1 * | 3/2004 | Sharpe | .................. | 715/762 |
| 6,871,319 B2 * | 3/2005 | Taboada et al. | .................. | 715/227 |
| 6,886,133 B2 * | 4/2005 | Bailey et al. | .................. | 715/269 |
| 6,892,348 B1 * | 5/2005 | Truelove et al. | .................. | 715/255 |
| 7,231,602 B1 * | 6/2007 | Truelove et al. | .................. | 715/205 |
| 2002/0174143 A1 * | 11/2002 | Taboada et al. | .................. | 707/509 |
| 2002/0188637 A1 * | 12/2002 | Bailey et al. | .................. | 707/530 |
| 2003/0131321 A1 * | 7/2003 | Teshima | .................. | 715/542 |
| 2005/0188307 A1 * | 8/2005 | Bailey et al. | .................. | 715/531 |
| 2007/0061714 A1 | 3/2007 | Stuple et al. | | |
| 2007/0220424 A1 | 9/2007 | Shaw et al. | | |

* cited by examiner

*Primary Examiner*—Doug Hutton
*Assistant Examiner*—Henry Orr
(74) *Attorney, Agent, or Firm*—Cantor Colburn LLP; Daniel McLoughlin

(57) ABSTRACT

A method for displaying formatting of text includes, receiving an input, wherein the input is a selected range of text, determining a formatting attribute of the selected range of text, displaying the determined formatting attribute, determining an amount of text having the formatting attribute in the selected range of text relative to a total amount of text in the selected range of text, marking the formatting attribute displayed with a non-textual indicator, marking the determined formatting attribute with a second type of indicator operative to indicate the amount of text having each of the formatting attribute in the selected range of text relative to the total amount of text in the selected range of text, marking text in the selected range of text with the non-textual indicator corresponding to the formatting attribute of the text in the selected range of text.

3 Claims, 5 Drawing Sheets

METHODS INVOLVING TEXT ATTRIBUTE RECOGNITION

CROSS REFERENCE TO RELATED APPLICATIONS

The present application is co-pending with the concurrently filed application, entitled "METHODS INVOLVING OBJECT ATTRIBUTE RECOGNITION," assigned to the assignee of the present application, the contents of which are incorporated herein by reference in their entirety.

BACKGROUND OF THE INVENTION

1. Field of the Invention

This invention relates generally to formatting text and specifically to displaying attributes of text.

2. Description of Background

Items displayed in a graphical user interface (GUI) such as text in word processors may include a number of different attributes such as different fonts and font sizes. The text may also be formatted to be, for example, bolded or underlined. Often, when a user selects a section of text, there is an indication on a GUI that shows the attributes of the selected text. If the selected text includes a number of different attributes such as two different types of fonts, the indication on the GUI for the font of the selected text is blank. This results in a user having limited feedback regarding the attributes of the selected text. Thus, it is desirable to use a method and system that allows a user to select text and quickly determine how they are formatted.

SUMMARY OF THE INVENTION

The shortcomings of the prior art are overcome and additional advantages are achieved through an exemplary method for displaying formatting of text includes, receiving an input, wherein the input is a selected range of text, determining a formatting attribute of the selected range of text, displaying the determined formatting attribute, determining an amount of text having the formatting attribute in the selected range of text relative to it total amount of text in the selected range of text, marking the formatting attribute displayed with a non-textual indicator, marking the determined formatting attribute with a second type of indicator operative to indicate the amount of text having each of the formatting attribute in the selected range of text relative to the total amount of text in the selected range of text, marking text in the selected range of text with the non-textual indicator corresponding to the formatting attribute of the text in the selected range of text.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1b illustrates the example of a prior art display the system illustrated in FIG. 1a.

FIG. 2b illustrates an alternate exemplary embodiment of the system involving text attribute recognition of FIG. 2a.

The detailed description explains the preferred embodiments of the invention, together with advantages and features, by way of example with reference to the drawings.

DETAILED DESCRIPTION OF THE INVENTION

Systems and methods involving displaying attributes of text are provided. Several exemplary embodiments are described.

Text is often displayed on a graphical user interface (GUI). Text in word processors and other applications may have a number of formatting attributes such as, for example different fonts, font sizes, bold lettering, italicized lettering, single spaces, and subscripts. The formatting attribute of the text may be indicated on a display in, for example GUI. The formatting attributes of the range of selected text may be displayed in a variety of manners. For example, if a user selects a range of text, the font type, font size, line spacing, and whether the font is bolded may be indicated in a combination box near the top of the display.

However, if the range of selected text includes text having non-uniform formatting attributes, e.g., two different types of fonts, the indication of the formatting attributes is blank.

Figure 1A:
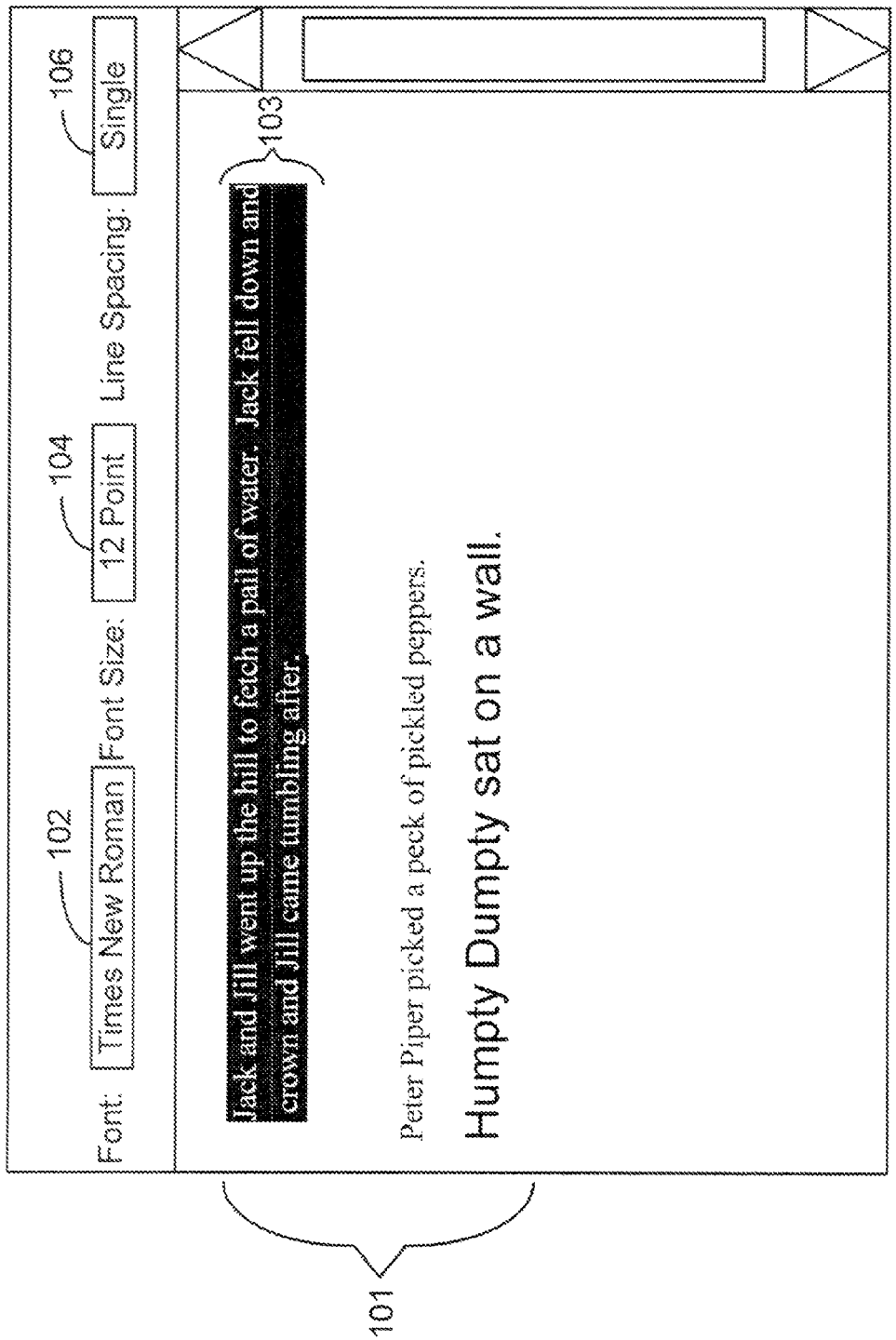
FIG. 1a illustrates an example of a prior art display of a system for editing text.

Thus, it is desirable for a method and system to indicate the formatting attributes of selected ranges of text having non-uniform formatting attributes. In this regard, FIG. 1a is a prior art example of an output of an application that includes text 101 and a selected range text 103 from the text 101. The formatting attributes of the selected range 103 of text are displayed in combination boxes: font type box 102, font size box 104, and line spacing box 106.

In the illustrated example of FIG. 1a, a user has selected a range of text 103 indicated by the highlighted text. The selected range of text 103 has the formatting attributes of "Times New Roman" displayed in the font type box 102, "12 point" displayed in the font size box 104, and "single" displayed in the line spacing box 106.

Figure 1B:
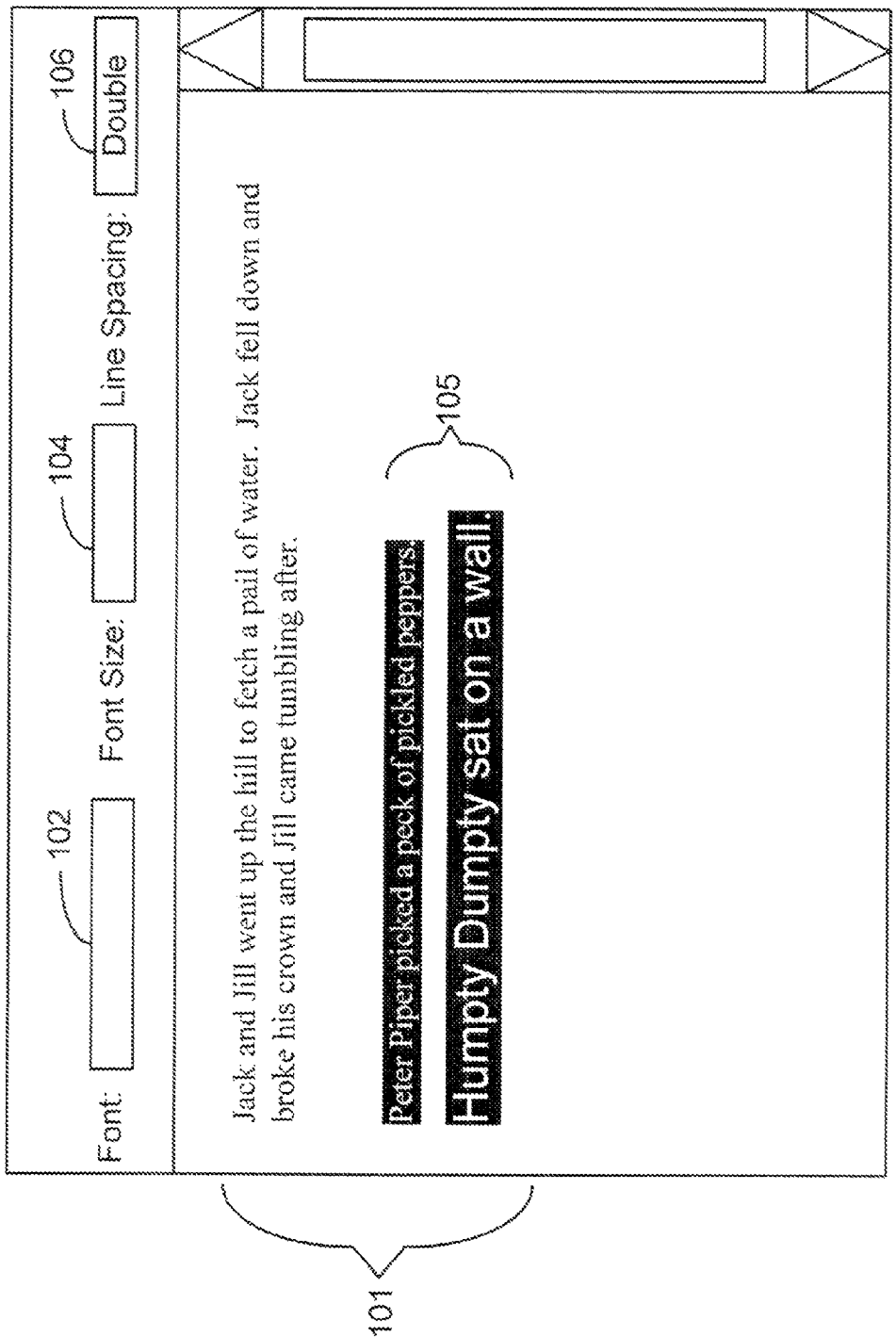

FIG. 1b illustrates a prior art example of a second range of text 105 from the text 101 selected by a user. The selected second range of text 105 includes the formatting attributes of two font types, Times New Roman and Arial, two font sizes 12 point and 20 point, and double line spacing. The formatting attributes of the selected second range of text are indicated by the displays of "double" line spacing box 106, and the font type box 102 and font size box 104 formatting attributes are blank.

Figure 3:
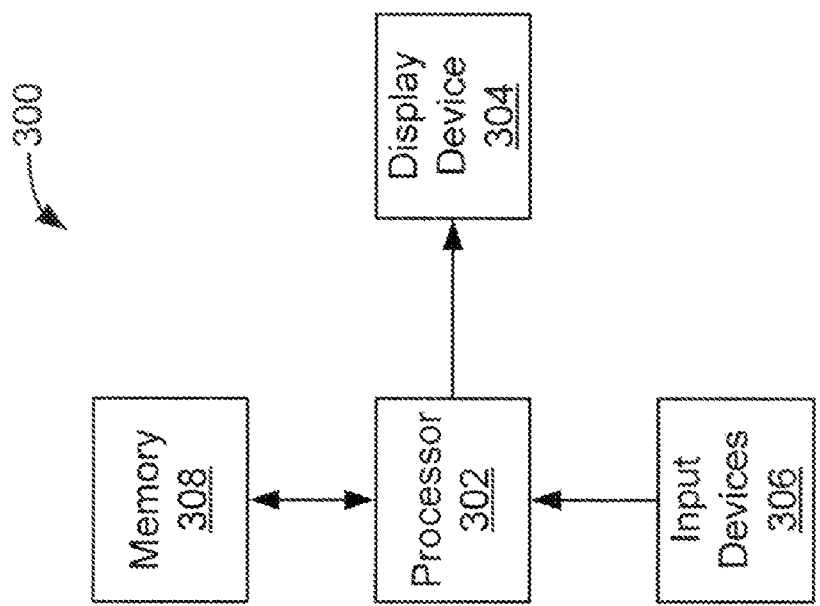
FIG. 3 illustrates an exemplary embodiment of a system for editing text.

FIG. 3 illustrates an exemplary embodiment of a system for editing text. The system 300 includes a processor 302 communicatively linked to a display device 304, input devices 306, and a memory 308. In operation, the processor 302 sends and receives data to and from the memory 308 for storage. The processor 302 outputs data for display to the display device 304, and receives inputs from a user via the input devices 306. Input devices 306 may include, for example, a keyboard and a mouse.

Figure 2A:
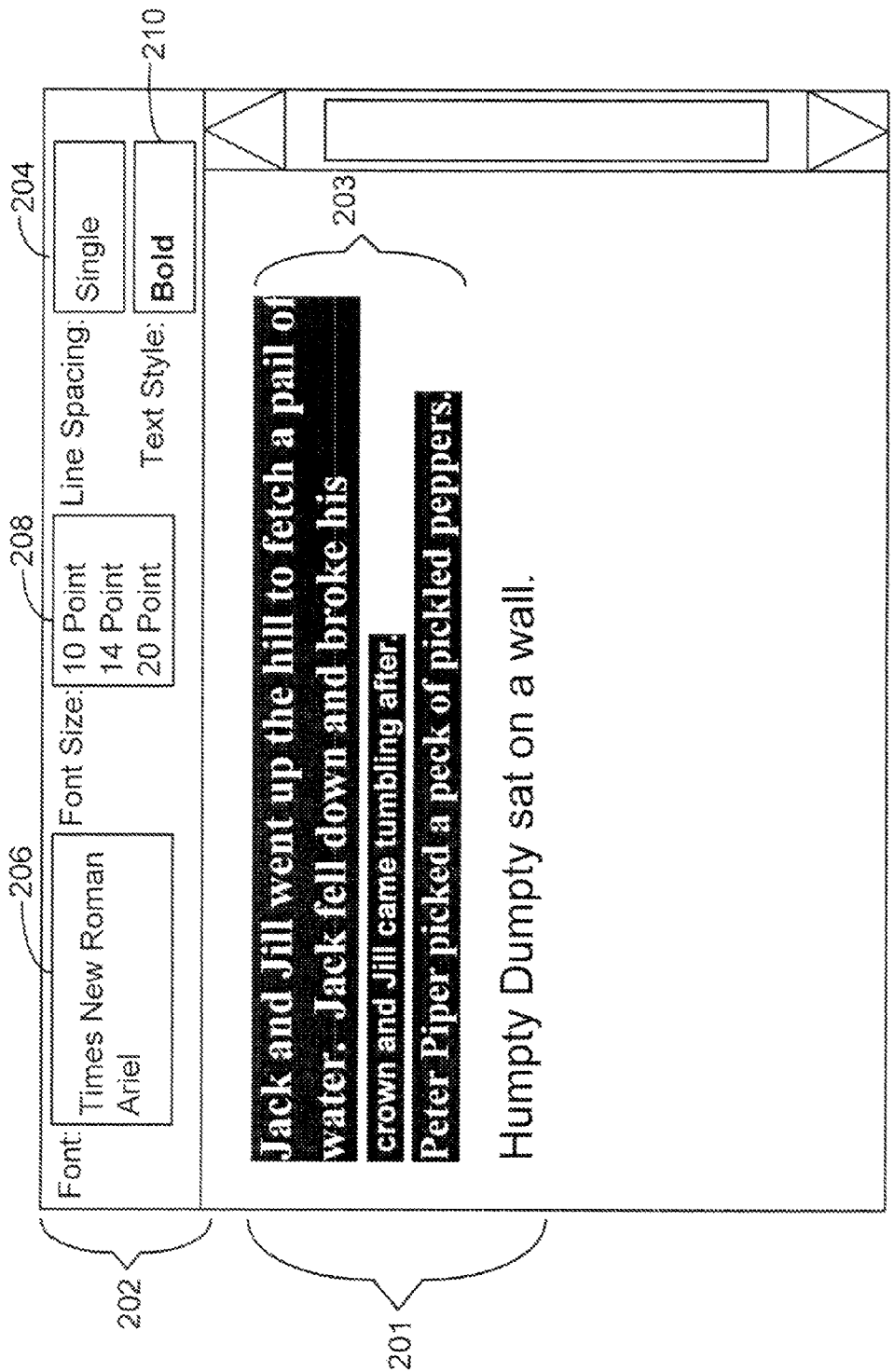
FIG. 2a illustrates an exemplary embodiment of a system involving text attribute recognition.

FIG. 2a illustrates an exemplary embodiment of a display from a system that displays the formatting attributes of a selected range of text when the selected range of text includes different formatting attributes of the same type. For, example, when a selected range of text includes multiple font types.

Referring to FIG. 2a, FIG. 2a includes text 201 and a selected range of text 203. Formatting attributes are displayed in combination boxes 202 and include a line spacing box 204, a font type box 206, a font size box 208, and a text style box 210, examples of text styles may include bold, italics, and underline. The use of combination boxes is but one possible embodiment for displaying the formatting attributes of text, other embodiments may use, for example, lists, icons, or other non-textual descriptors to display formatting attributes. The formatting attributes, in the illustrated embodiment are non-limiting examples of possible formatting attributes that may be displayed. Other types of formatting attributes may also be displayed in the system.

Referring to FIG. 2a, in operation, a user has selected the range of text 203. In the illustrated embodiment the range of text 203 is highlighted in black, and the letters of the range of text 203 are white. The range of text 203 includes two font types, Times New Roman and Arial. The two font types are displayed in the font type box 206. The range of text 203 also includes three font sizes, 10 point, 14 point, and 20 point that are displayed in the font size box 208. The range of text 203 is in bold format and single spacing as indicated in the text style box 210 and the line spacing box 204.

Figure 2B:
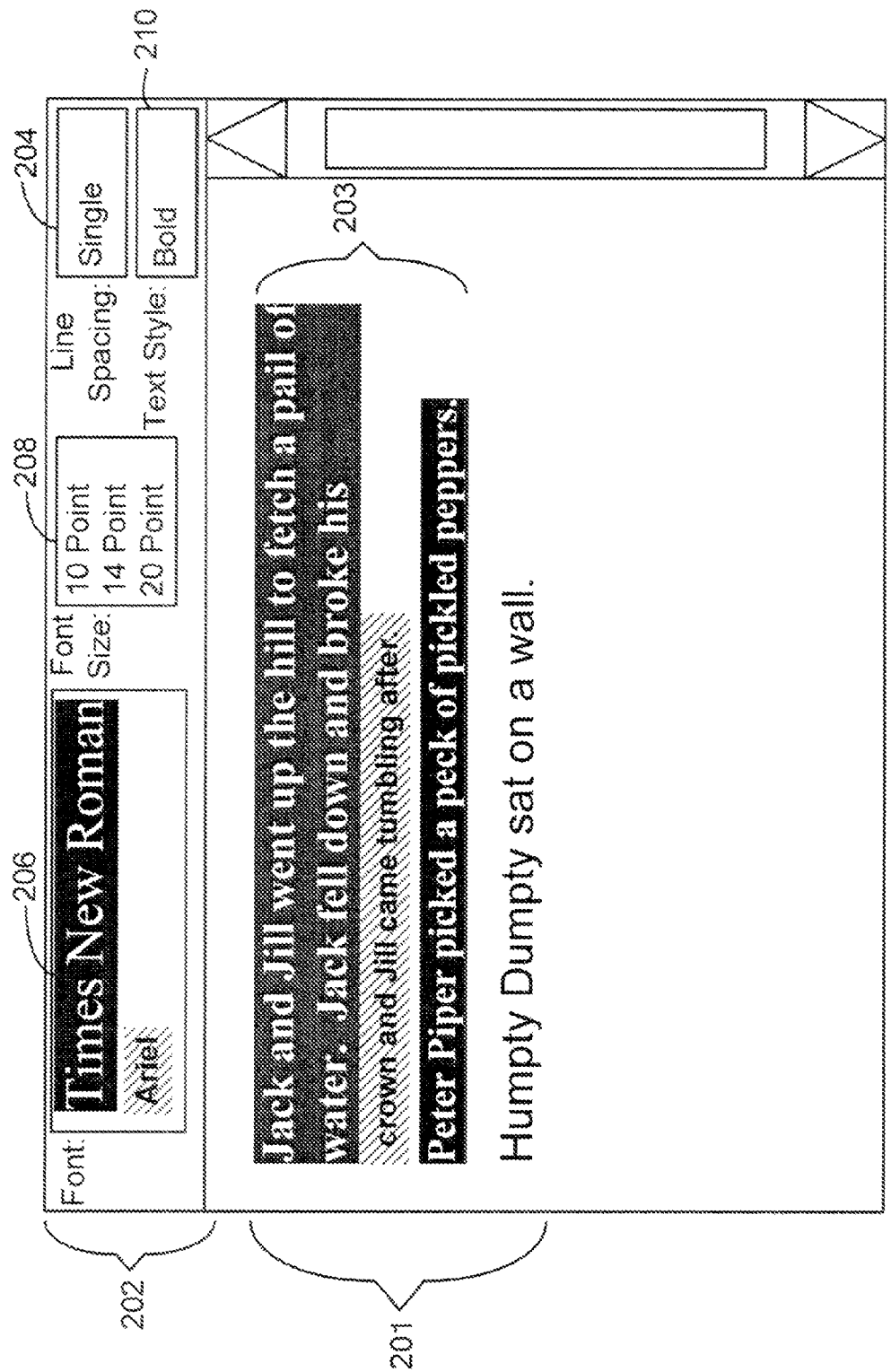

FIG. 2b illustrates an alternate exemplary embodiment of the embodiment illustrated in FIG. 2a. In FIG. 2b, a user has again selected the range of text 203. The selected range of text 203 has the same formatting attributes indicated in the combination boxes 202 as indicated in FIG. 2a. In the embodiment illustrated in FIG. 2b, the font type box 206 includes "Times New Roman" and "Ariel" each highlighted with a different shading. The selected range of text 203 is also highlighted with the shading corresponding to the shading of the font type in the font type box 206. Thus, the text in the selected range of text 203 that is Times New Roman is highlighted with the same type of shading as the "Times New Roman" in the font type box 206, while the Arial text in the selected range of text 203 is highlighted with the same type of shading as the "Arial" in the font type box 206.

Additionally, it may be desirable to indicate an amount of text in the selected range of text 203 that has a particular formatting attribute relative to the total amount of text in the selected range of text 203. For example, referring to FIG. 2b, the selected range of text 203 includes Times New Roman font and Ariel font. The amount of Times New Roman font selected relative to the entire selected range of text 203 is greater than the relative amount of Ariel text. Thus, in the font type box 206 the "Times New Roman" having a large size indicates the amount of Times New Roman text relative to the entire selected range of text 203. This feature is not limited to relative sizes of fonts, but may also be used to indicate other formatting attributes. The indication may also be used to indicate an amount of a particular formatting attribute in the selected range of text 203 relative to all of the text 201.

The difference in shading indications in the selected range of text 203 corresponding to the shading indications for the type of font displayed in the font type box 206 allows a user to quickly determine the formatting attributes of selected text.

The use of similar indicators may also be implemented for other formatting attributes such as, for example font size, line spacing, and text style.

The indicators may include any non-textual indicator that may designate a selected range of text as having particular formatting attributes. For example, the indicators may include, but are not limited to, colored highlighting, colored text, patterned highlighting, a variety of shading types, and patterned text. Other non-textual indicators may include animated indicators such as, for example flashing text, flashing highlighting, patterns that change, and colors that change. Icons may also be used that indicate a formatting attribute. The icons may include visual indicators similar to the indicators discussed above. The illustrated embodiments include combination boxes 202 that are used to indicate the formatting attributes. Other methods for indicating formatting attributes may be used that may include displaying formatting attributes in, for example, status bars or in other areas of a display.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for displaying formatting of text, the method comprising:
   receiving an input, wherein the input is a selected range of text;
   determining a formatting attribute of the selected range of text;
   displaying the determined formatting attribute;
   determining an amount of text having the formatting attribute in the selected range of text relative to a total amount of text in the selected range of text;
   marking the formatting attribute displayed with a non-textual indicator;
   marking the determined formatting attribute with a second type of indicator operative to indicate the amount of text having each of the formatting attribute in the selected range of text relative to the total amount of text in the selected range of text;
   marking text in the selected range of text with the non-textual indicator corresponding to the formatting attribute of the text in the selected range of text.

2. The method of claim 1, wherein the non-textual indicator includes:
   color;
   pattern; and
   animation, wherein animation includes:
      changing patterns;
      changing colors; and
      flashing.

3. The method of claim 1, wherein the second type of indicator comprises text sizes of the displayed determined formatting attribute.

* * * * *